Apr. 24, 1923.
E. H. SHERBONDY
VEHICLE CHASSIS
1,452,532
Filed April 20, 1921      4 Sheets-Sheet 1
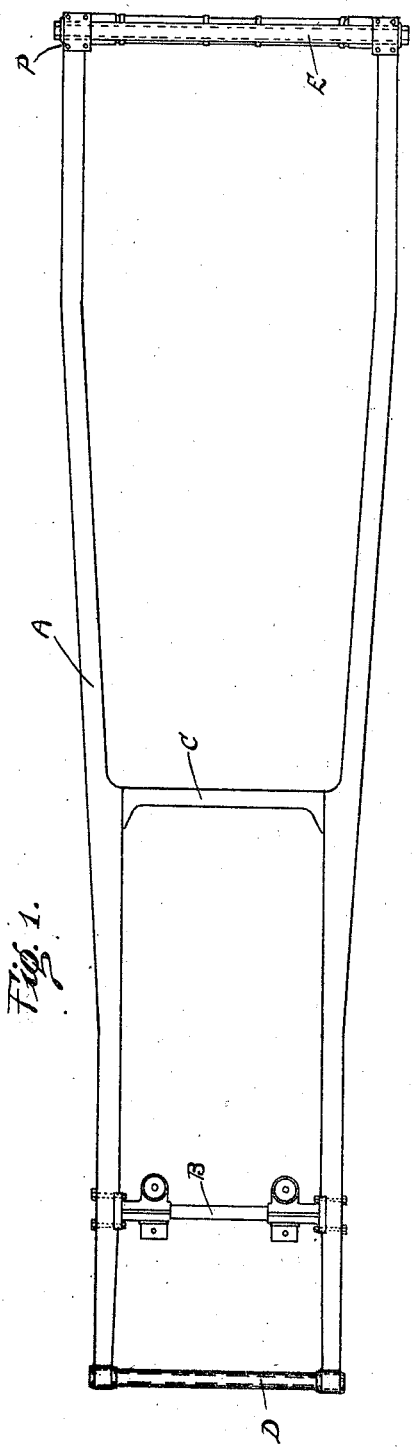
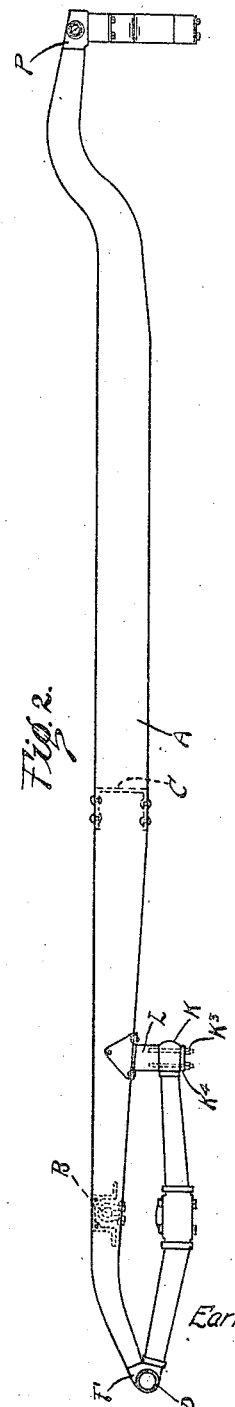
Inventor
Earl H. Sherbondy
By Whittemore Hulbert Whittemore
Belknap       Attorneys Apr. 24, 1923.

E. H. SHERBONDY 1,452,532

VEHICLE CHASSIS

Filed April 20, 1921

Inventor
Earl H. Sherbondy

By Whittemore Hulbert Whittemore
& Belknap
Attorneys

Apr. 24, 1923.
E. H. SHERBONDY
VEHICLE CHASSIS
Filed April 20, 1921
1,452,532
4 Sheets-Sheet 3
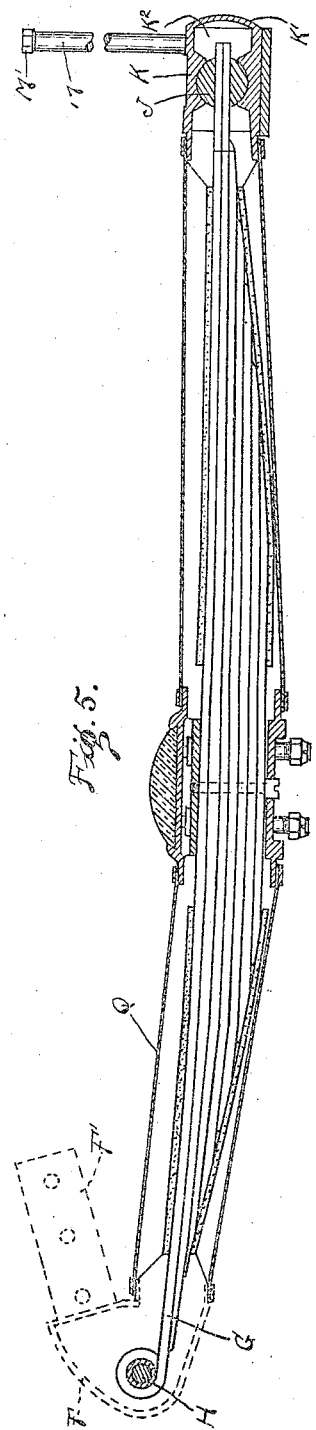
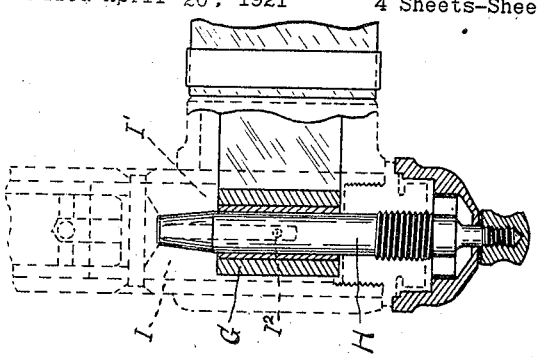
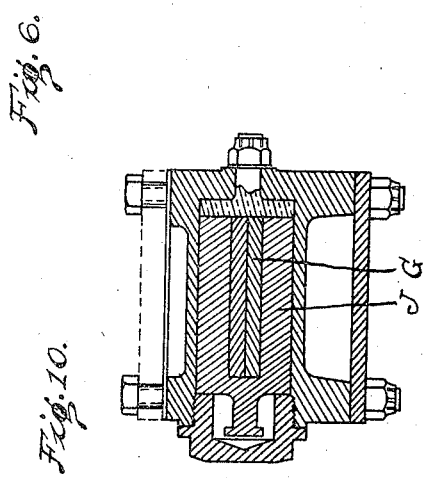
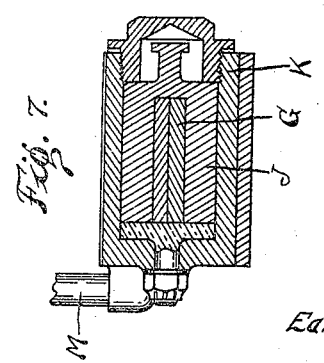
Inventor
Earl H. Sherbondy
By Whittemore Hulbert Whittemore
+Belknap           Attorneys

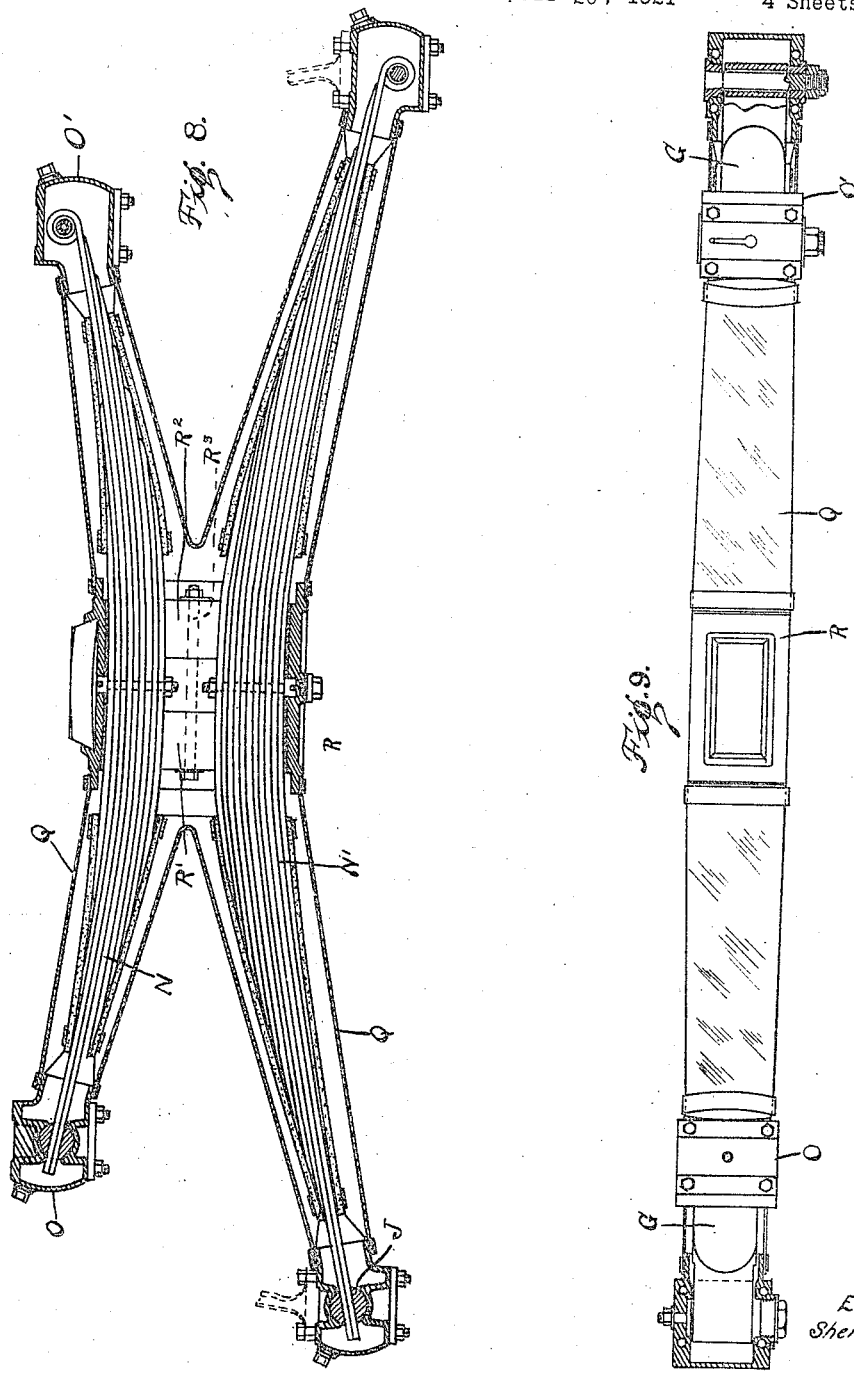

Patented Apr. 24, 1923.

1,452,532

UNITED STATES PATENT OFFICE.

EARL H. SHERBONDY, OF DETROIT, MICHIGAN, ASSIGNOR TO SIDNEY D. WALDON, OF DETROIT, MICHIGAN.

VEHICLE CHASSIS.

Application filed April 20, 1921. Serial No. 463,004.

*To all whom it may concern:*

Be it known that I, EARL H. SHERBONDY, a citizen of the United States of America, residing at Detroit, in the county of Wayne and State of Michigan, have invented certain new and useful Improvements in Vehicle Chassis, of which the following is a specification, reference being had therein to the accompanying drawings.

The invention relates to chassis construction for motor vehicles and has particular reference to the construction of the frame and spring suspension.

In the present state of the art chassis frames are usually formed of channel members constituting side sills and cross members which are either channel bars or in some instances are tubular. The frame is supported upon springs attached thereto by various constructions and frequently the springs are housed in flexible lubricant casings.

It is one of the objects of the present invention to utilize a structural member of the chassis frame as a lubricant container and to so connect the springs to the frame that lubricant will be fed from such container to the springs while in use. With this object in view I have devised a novel construction of frame and spring attachment and also various specific features of construction as hereinafter set forth.

In the drawings,—

Figure 1, is a plan view of the chassis frame.

Figure 2, is a side elevation thereof.

Figure 5 is a longitudinal section through the housing for the forward spring and bearing therefor;

Figure 6 is a horizontal section thereof;

Figure 7 is a vertical section;

Figure 8 is a transverse section in the plane of the rear spring; and

Figure 9 is a sectional plan view thereof.

Figure 10 is a view similar to Figure 7.

Figure 3:
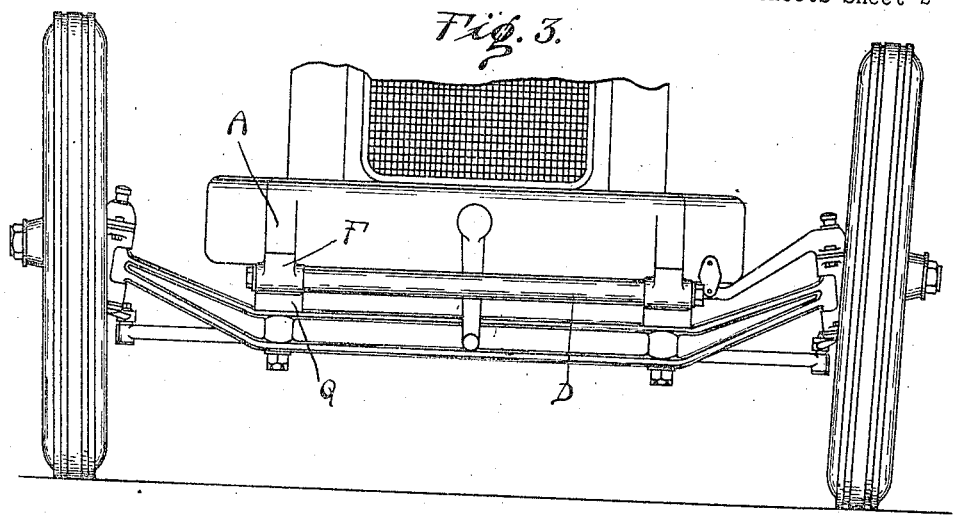
Figure 3 is a front elevation.
Figure 4:
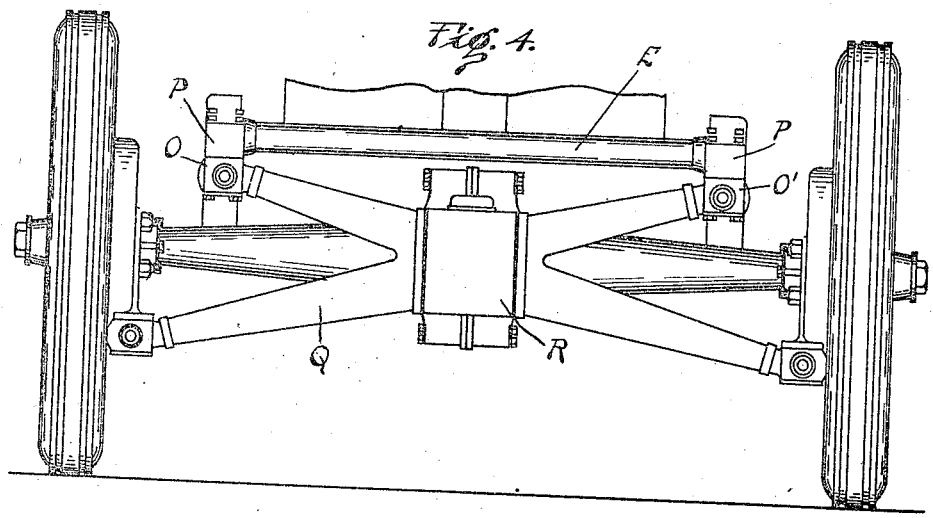
Figure 4, is a rear elevation.

A are side sills of the chassis frame which as shown are channel bars. B and C are cross bars between said side sills constituting the motor support, and D and E are cross bars at the forward and rear ends of the frame. These latter cross bars are tubular and constitute the lubricant containers for the lubrication of the forward and rear springs and their connecting bearings. For mechanically attaching the springs so as to also permit of feeding the lubricant thereto various specific constructions may be employed. As shown the forward springs are attached at their forward ends to the hollow fittings F having shank portions F' secured in the ends of the sills and being also cross-connected by the tubular member D. The member F constitutes the end portion of the housing for the spring G which extends therein and is mechanically attached by a pin H. This pin is in axial alignment with the tubular member D being supported at one end in a bearing I forming a plug or end wall for the lubricant container. The pin H is also provided with a central channel I' therein communicating with a radial port I² located in the center of the spring G, thus the lubricant from the hollow member D is permitted to feed into the pin and to the bearing I passing from the ends of the latter into the hollow member F and down along the spring leaves to the center portion of the spring.

The rear end of the spring G engages a pin J which is transversely slotted to receive the spring leaves and permit longitudinal sliding movement thereof required for the flexing of the spring. The pin J is journalled in a bearing K formed in a hollow member K', which is clipped or otherwise secured to bracket L depending from the sill A. On one side of the pin within the hollow member is a chamber K² for containing lubricant and which may be supplied from a vertical conduit M having at its upper end a detachable cap M'; thus the lubricant within the chamber K² will feed into the bearing for the pin and also between the pin and the spring leaves maintain these parts thoroughly lubricated, and after passing these bearings will continue down along the spring leaves to lubricate the same.

The rear spring, as specifically shown, comprises the upper and lower leaf spring members N and N' which are respectively upwardly and downwardly bowed and are centrally clipped to each other. Each of these springs are substantially the same in construction as the spring G previously described and is attached by pins similar in construction to the pins I and J. There are also provided hollow members O O' which form bearings for the pins and means of attachment to the sill members A.

The lubricant contained in the hollow cross member E is fed from the opposite ends thereof through channels in bearing blocks P in the sills and through registering channels in the bearings into members O, so as to lubricate said bearings and to finally pass down the spring N to the center thereof; from this point the lubricant will drop to the lower spring N' and will feed to the ends thereof where it will further lubricate the pins which attach the same to the axle. Both forward and rear springs are enclosed in flexible casings Q, which extend from the hollow members at the ends thereof to the rigid bearing at the center, thus all of the lubricant will be retained and dust is prevented from access to the lubricating parts.

To reduce the weight of the construction some of the hollow members forming the bearings for the ends of the springs are preferably formed of aluminum, and as this material is relatively weak in tensile strength the bearings are so constructed as to be placed in compression, thus the member K is secured to the bracket member L by clamping bolts or studs $K^3$ passing therethrough and a plate $K^4$ of harder metal is placed at the bottom to take the direct bearing on the bolts. The same construction is applied to the members O for the rear springs.

The upward and downward bowed spring members N N' of the rear spring are preferably secured to each other by a yoke or strap R, surrounding the same in cooperation with wedge members R' and $R^2$, arranged between said members N and N' and drawn towards each other by clamping bolt $R^3$.

What I desire to claim is:

1. In a chassis, the hollow member forming a structural element of the frame to support the spring for the frame, a pivotal connection between said spring and the frame, and means for feeding lubricant from said hollow member to said pivotal connection.

2. In a chassis, the combination with a hollow member forming a structural element of the frame, of a spring, a casing for said spring, a pivotal connection between said spring and frame, and means for feeding lubricant from said hollow member to said pivotal connection and into said casing for the spring.

3. In a chassis, the combination with a hollow member forming a structural element of the frame, of a spring, a casing enclosing said spring, a pivotal connection for said spring, a hollow member forming a bearing for said pivotal connection, and means for feeding lubricant from said first mentioned hollow member into said last mentioned hollow member to lubricate said bearing and to discharge the lubricant into said spring casing.

4. In a chassis, the combination with side sills of a hollow cross bar between said sills forming a structural element, and a lubricant container, a spring, and means for feeding lubricant from said hollow member to said spring.

5. In a chassis, the combination with side sills of a hollow cross bar between side sills forming a structural element and a lubricant container, a spring, a housing for said spring, and means for feeding lubricant from said hollow member to the spring within said housing.

6. In a chassis, the combination with side sills of a hollow cross bar extending therebetween and forming a structural element, and a lubricant container, springs connected to the frame adjacent to the opposite ends of said hollow member, a housing for said springs and means for feeding lubricant from said hollow member to said springs within said housing.

7. In a chassis, the combination with side sills of a tubular cross bar connecting the ends of side sills and forming a structural element, a lubricant container, hollow members to which the opposite ends of said tubular cross bar are connected, springs projecting into said hollow members, pivoted bearings for said springs within said hollow members, and means for feeding lubricant from said tubular cross bar to said pivoted bearings in said hollow members.

8. In a chassis, the combination with side sills of hollow members forming extensions of said sills and tubular cross bar connecting said hollow members and forming a structural element and a lubricant container, pivoted bearings in said hollow members in alignment with said tubular cross bar, springs engaging said pivoted bearings within said hollow members and means for feeding lubricant from said tubular cross bar to said bearings.

9. In a chassis, the combination with side sills of hollow members forming extensions of said sills, a tubular cross bar connecting said hollow members and forming a structural element, and a lubricant container, pivoted bearings in said hollow members in alignment with said tubular cross bar, springs engaging said pivoted bearings within the said hollow members and means for feeding lubricant from said tubular cross bar to said bearings.

10. In a chassis, the combination with side sills of hollow members forming extensions of said sills, a tubular cross bar connecting said hollow members and forming a structural element, and a lubricant container, pivot pins within said hollow members, springs projecting within said hollow members and engaging said pivot pins, housing for said springs connected with said hollow members and means for feeding lubricant from said tubular member to said pivot pins and to the springs within said casings.

11. In a chassis, the combination with side sills of hollow members forming extensions of said sills, a tubular cross bar connecting said hollow members and forming a structural element and a lubricant container, hollow members secured to said sills beneath the same and intermediate the ends thereof, springs having their opposite ends extending into said hollow members, pivoted bearings for said springs within said hollow members, a housing enclosing said springs connected to said hollow members, means for feeding lubricant from said tubular cross bar to the pivoted bearing in the adjacent hollow member, and means for feeding lubricant to the pivoted bearings in the hollow members beneath the sills, the lubricant passing from said pivoted bearings feeding upon said springs within said housing.

12. In a chassis, the combination with a frame of a spring for supporting the same, a pivot engaging the end of said spring and a hollow member enclosing said pivot forming a bearing therefor and a lubricant container.

13. In a chassis, the combination with a frame of a hollow structural element, the said hollow element forming the lubricant container, a spring, a pivoted bearing for said spring, and a hollow member forming a bearing for said pivot into which lubricant is fed from said hollow lubricant container.

14. In a chassis, the combination of side sills of tubular cross bars extending between said sills adjacent to opposite ends thereof, hollow members to which the tubular cross bars are connected, springs extending longitudinally of the chassis pivotally connected thereto within said hollow members at one end thereof, a spring extending transversely of the frame having pivoted bearings in the hollow members at the opposite end of the frame and means for feeding lubricant from said tubular cross bars into said hollow members to the spring pivoted bearing.

15. In a chassis, the combination with side sills, of a lubricant container between said sills forming a structural element, a spring, and means for feeding lubricant from said container to said spring.

16. In a chassis, the combination with side sills, of a hollow cross bar connected to said sills and adapted to contain a lubricant, a spring, and means for feeding lubricant from said hollow cross bar to said spring.

17. In a chassis, the combination with a frame having a hollow structural element forming a lubricant container, a spring, a bearing for said spring, and a hollow member forming a support for said bearing into which lubricant is fed from said hollow lubricant container.

In testimony whereof I affix my signature.

EARL H. SHERBONDY.